July 15, 1924.

H. L. GIBBONS 1,501,767

HAND OPERATED GEAR SHIFT

Filed March 12, 1923

Inventor

Harold L. Gibbons

Patented July 15, 1924.

1,501,767

UNITED STATES PATENT OFFICE.

HAROLD L. GIBBONS, OF HALIFAX, NOVA SCOTIA, CANADA.

HAND-OPERATED GEAR SHIFT.

Application filed March 12, 1923. Serial No. 624,506.

*To all whom it may concern:*

Be it known that I, HAROLD L. GIBBONS, a subject of the King of England, residing at Halifax, in the Province of Nova Scotia and Dominion of Canada, have invented certain new and useful Improvements in a Hand-Operated Gear Shift, of which the following is a specification.

This invention relates to improvements in gear shifts for automobiles and has for its prime object to provide a hand operated gear shift.

A further object of my invention is to provide a hand operated gear shift that works in connection with the clutch, so that the operator of the automobile has the free use of his feet for operating the brakes and accelerator.

A still further object of my invention is to provide a gear shift lever that is connected to the clutch, so that the operator of the automobile may disengage the clutch when grasping and moving the gear shift lever.

A still further object of my invention is to provide a device of the character indicated whereby the clutch will be allowed to engage when the gears have been shifted and the operator has removed his hand from the gear shift lever.

And a still further object of my invention is to provide a device of the character indicated that will absolutely dispense with all gear trouble arising from any effort on the part of the driver of the automobile trying to change gears without disengaging the clutch.

And a still further object of my invention is to provide a device of the character indicated, whereby, the service foot brake is connected with the clutch so that in coasting down a hill, it is not necessary to move the gear shift lever as the clutch will be automatically disengaged by applying pressure to the brake pedal, thus eliminating brake and clutch trouble originating from applying the foot brake to a car while the engine is engaged.

An additional object of my invention is to provide a device of the character indicated, which is simple in construction and operation, durable, efficient for the purpose intended, and one that can be installed on an automobile at a relatively low cost.

These and like objects of the invention will be better understood as the description follows and as is specifically pointed out in the appended claims.

Figure 1:
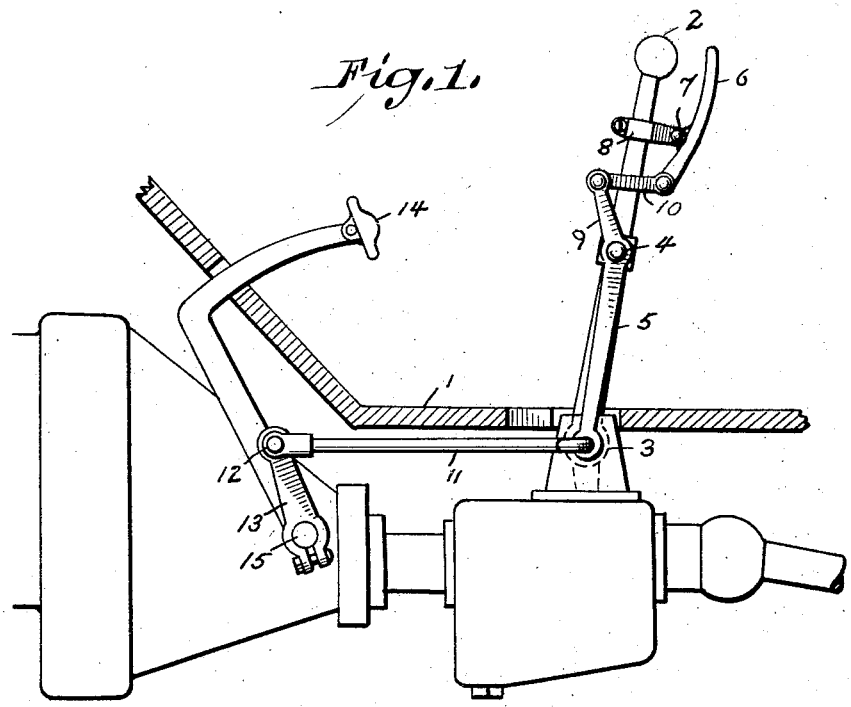
Figure 2:
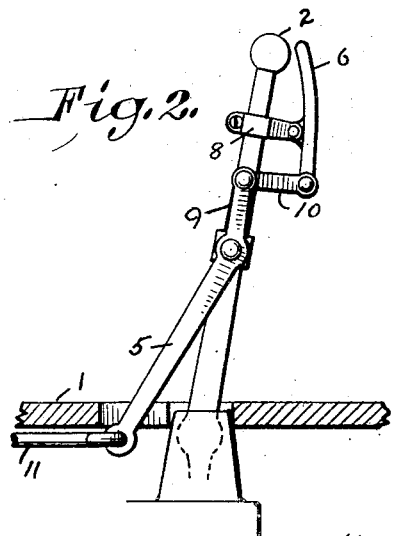

Referring to the accompanying drawing which forms a part of this specification and which clearly illustrates the construction and operation of my improved hand operated gear shift, Figure 1 is a longitudinal section through a portion of an automobile, showing my invention applied thereto, and Figure 2 shows the position of the gear shift relative to the clutch operating means when the clutch is in a disengaged position.

Referring to the accompanying drawing in detail, like characters will be used to designate like parts in the different views.

In the drawing, the numeral 1 indicates the floor board of an automobile, 2 a hand operated gear shift lever which works in a ball and socket joint as indicated at 3 by dotted lines.

Pivotally attached to one side of the gear shift lever 2 as at 4 is a clutch operating lever 5, and an auxiliary handle 6 is pivotally attached as at 7 to a clamp 8 mounted on the upper end of the gear shift lever 2. The clutch operating lever 5 has a portion 9 formed on the upper end of same which is positioned on an angle of 45° at a point adjacent the pivotal connection 4. The free end of the portion 9 is pivotally connected by means of a link 10 with the lower end of the auxiliary handle 6. The lower end of the clutch operating lever 5 is formed with an eye therein, which is normally positioned adjacent the ball and socket joint of the gear shift lever 2. An operating rod 11 is connected at one end to the eye formed in the member 5, while the opposite end of the rod is pivotally connected as at 12 to a clutch control member 13.

When the members 5 and 6 are in the position indicated in Figure 1, the clutch is normally engaged, and when it is desired to disengage the clutch for the purpose of shifting the gears, pressure is applied to the upper end of the auxiliary handle 6, which causes the member 5 to swing on the pivot 4 and the lower end of the member 5 to move forward as indicated in Figure 2, thus disengaging the clutch to allow shifting of the gears by means of the handle 2. As soon as the gears have been suitably shifted, pressure is released from the auxiliary handle 6, allowing the member 5 to assume the position indicated in Figure 1, thus permitting the clutch to engage.

In order to avoid the necessity of the operator of the machine shifting the gear 2 when desiring to coast down a hill, the member 13 is connected with a foot pedal 14 by means of a rod 15, so that when pressure is applied to the service foot pedal, the clutch will be automatically disengaged, and further pressure will apply the brakes.

In view of the foregoing description of my invention taken in connection with the accompanying drawing, it is thought that any further explanation as to the construction, operation, and objects of my invention are unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a clutch operating device, the combination with the usual pivoted gear shift lever, a clutch lever pivotally mounted upon said gear shift lever, and means carried by said gear shift lever for operating the clutch lever for disengaging the clutch when shifting the gears.

2. In a clutch operating device, the combination with the usual pivoted gear shift lever, a clutch lever pivotally mounted on the gear shift lever, an auxiliary handle carried by said gear shift lever and pivotally connected to the clutch operating lever, and means connecting said clutch lever with the clutch for disengaging the same when applying pressure to the gear shift lever and the auxiliary handle for moving said gear shift lever.

3. In a clutch operating device, the combination with the usual pivoted gear shift lever, a clutch lever pivotally mounted upon the gear shift lever, means carried by the gear shift lever for operating the clutch lever for disengaging the clutch when shifting the gears, said clutch lever having its lower end adjacent the pivot of said gear shift lever so when the gear shift lever is moved upon its pivot the lower end of said clutch lever will remain approximately in the same place so as not to affect the clutch.

In testimony whereof, I have affixed my signature in the presence of two witnesses.

HAROLD L. GIBBONS.

Witnesses:
MARGERY JOHNSON,
J. B. KENNY.